United States Patent [19]
Bushek et al.

[11] 3,828,118
[45] Aug. 6, 1974

[54] ELECTRICAL FEEDTHROUGH ASSEMBLIES FOR CONTAINMENT STRUCTURES HAVING SPECIALLY CONTROLLED ENVIRONMENTS AND METHOD OF MAKING

[75] Inventors: James A. Bushek, Woodland Hills; David K. Sorensen, Westlake Village, both of Calif.

[73] Assignee: Bunker Ramo Corporation, Oak Brook, Ill.

[22] Filed: Apr. 6, 1972

[21] Appl. No.: 241,722

[52] U.S. Cl.............. 174/11 R, 29/592, 174/18, 174/151, 174/152 R, 260/37 EP
[51] Int. Cl. ................. G21c 13/02, H01b 17/26
[58] Field of Search..... 174/11 R, 11 BH, 18, 22 R, 174/23 R, 70 S, 110 E, 142, 151, 152 R, 153 R; 339/60 R, 60 M, 94 R, 94 A, 94 M, 113 R, 117 R, 117 P, 126 R, 126 RS, 214 R, 214 C, 218 R, 218 M; 29/592

[56] References Cited
UNITED STATES PATENTS
3,433,893  3/1969  Hofmann et al................ 174/153 R
3,434,087  3/1969  Hofmann..................... 174/110 E X FOREIGN PATENTS OR APPLICATIONS
1,340,207  9/1963  France............................. 174/151
817,785   8/1959  Great Britain...................... 174/142
950,379   2/1964  Great Britain...................... 174/151

*Primary Examiner*—Laramie E. Askin
*Attorney, Agent, or Firm*—N. Cass; F. M. Arbuckel

[57] ABSTRACT

A construction and method of making a hermetically sealed electrical feedthrough assembly particularly useful for providing electrical connections to and from a containment structure having a specially controlled environment. The feedthrough assembly construction and method of making provide a resultant assembly which achieves the desired electrical performance, while also being able to maintain the integrity of the controlled environment of the containment structure over long periods of time under widely varying environments and for both normal and emergency conditions. The feedthrough assembly includes a header plate containing feedthrough modules employing a specially chosen and designed cast epoxy sealing system which provides for hermetic sealing of each module to the header plate while also permitting each module to be readily mounted and removed. Continuous and simultaneous pressure testing of the integrity of both the inner and outer sealing of each module is made possible by the provision of internal manifolding ports within the header plate which communicate with each other as well as with a porous reticular dielectric preform provided in each module. The porous reticular dielectric preform serves to support the module feedthrough contacts during casting, and afterwards, because it is porous, permits simultaneous pressure testing of the integrity of the sealing of the feedthrough contacts within the modules along with the testing of the integrity of the sealing of the module mountings to the header plate. Each feedthrough module additionally has a construction which provides substantially rigid electrical and mechanical coupling between input and output conductors so as to eliminate the need for insulated wires within the assembly.

18 Claims, 6 Drawing Figures

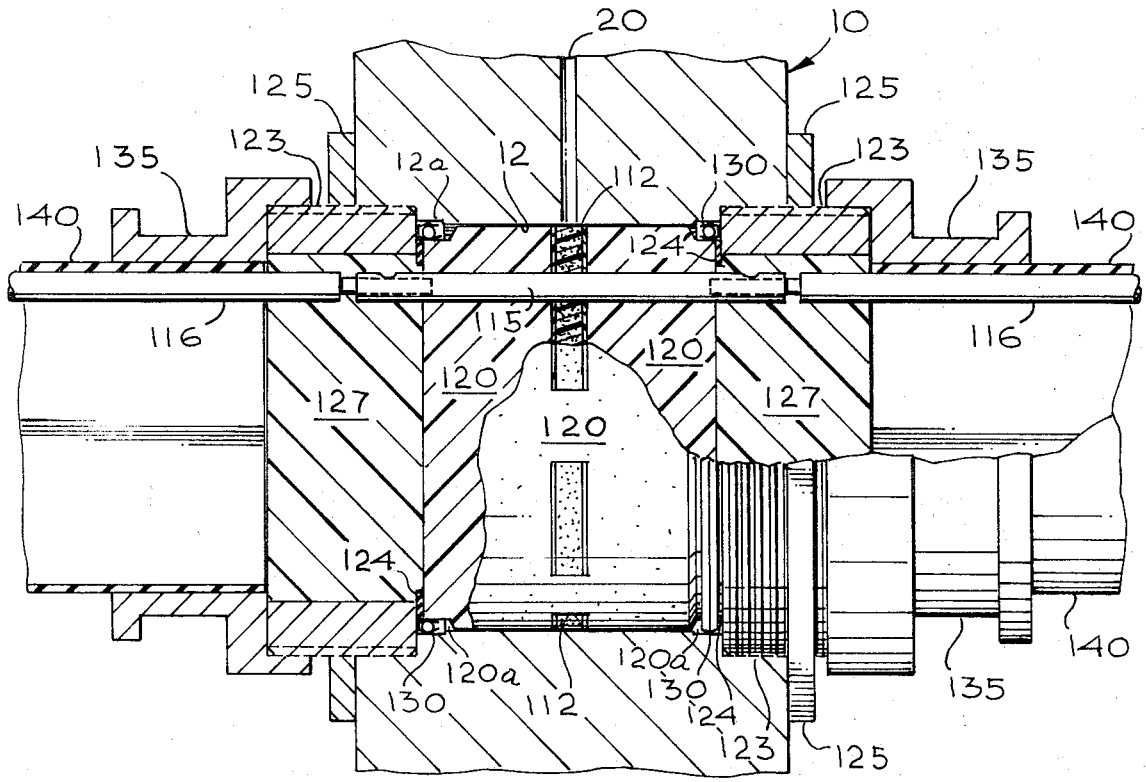
Fig. 2
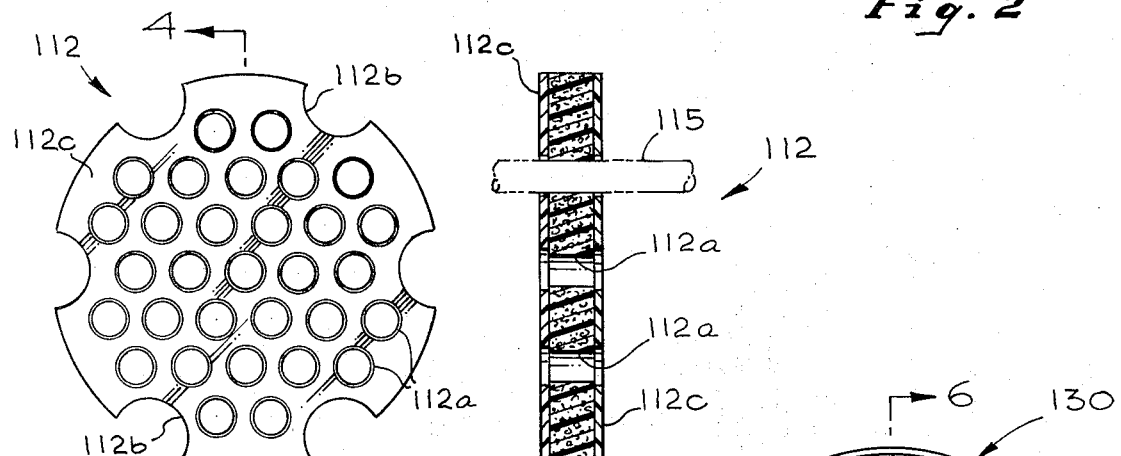
Fig. 3
Fig. 4
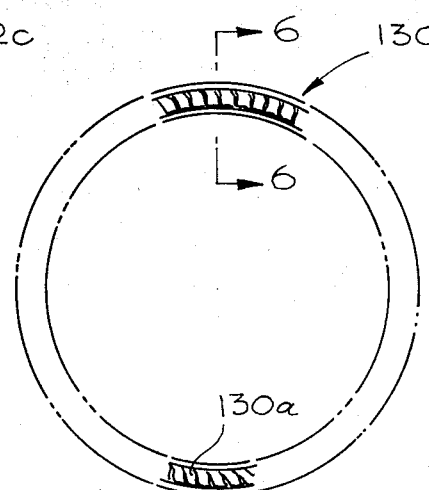
Fig. 5
Fig. 6

3,828,118

ELECTRICAL FEEDTHROUGH ASSEMBLIES FOR CONTAINMENT STRUCTURES HAVING SPECIALLY CONTROLLED ENVIRONMENTS AND METHOD OF MAKING

BACKGROUND OF THE INVENTION

The providing of electrical feedthrough connections to devices within a containment structure requiring a specially controlled environment has presented considerable difficulties in the art, since such connections must be provided in a manner so as not to affect or interfere with the maintenance of the integrity of the environment within the containment structure. These difficulties are made even more severe where the electrical feedthrough assembly is also required to provide this capability over very long periods of time (e.g., 40 years), and under widely varying environmental conditions. Still further difficulties are presented when it is additionally required that hermetically sealed electrical feedthrough connections be provided for the assembly which are capable of being readily installed and removed as well as being able to also provide for continuous pressure testing of sealing integrity.

Typical containment structures to which the invention may be applied are, for example, those associated with nuclear reactors, hot cells, radiation laboratories, marine applications and fuel reprocessing facilities. An appreciation of the stringent requirements which an electrical feedthrough connection may have to meet will be obtained by noting, that, under emergency conditions, an electrical feedthrough assembly for a nuclear reactor may have to withstand pressures and temperatures as high as 1,250 PSIG and 500° F, respectively, as well as extreme levels of radiation.

SUMMARY OF THE INVENTION

It is accordingly a broad object of the present invention to provide improved means and methods for providing hermetically sealed electrical feedthrough connections.

Another object is to provide an improved method of making and constructing an electrical feedthrough assembly for a containment structure having a specially controlled environment.

A further object of the invention is to provide an improved method of making and constructing an electrical feedthrough assembly for a controlled environment containment structure so as to permit obtaining desired electrical performance, while maintaining the integrity of the containment environment under both normal and emergency conditions over long periods of time and for widely varying environmental conditions.

Still another object of the invention is to provide an electrical feedthrough assembly and method of making particularly suited for a nuclear reactor containment structure.

Yet another object of the invention is to provide a method of making and constructing an electrical feedthrough assembly for a containment structure containing removable, redundantly sealed feedthrough modules.

A further object of the invention is to provide a method of making and constructing an electrical feedthrough assembly containing removable, hermetically sealed feedthrough modules and which also provides for continuous and simultaneous pressure testing of the integrity of both the inner and outer sealing of the modules.

Still further objects of the invention are to provide an improved electrical feedthrough assembly for a containment structure which additionally provides superior heat transfer, modular construction, high conductor density, conductor modular replaceability and interchangeability, continuous leak detection capability, compact size for faster leak detection, field serviceability and ease of handling, greater integrity, economy of design, and versatility on upgrading existing services.

An additional object of the invention is to provide improved means and methods for obtaining a removable, hermetically sealed mounting for electrical connectors and the like.

In accordance with an exemplary embodiment of the present invention, a feedthrough assembly is provided comprising a header plate which attaches to a containment structure and incorporates a plurality of removably mounted and hermetically sealed electrical feedthrough modules with internal manifolding being provided in a manner which permits continuous pressure testing of the integrity of both the inner and outer module sealing.

A particularly advantageous feature of the invention resides in the manner in which each module is constructed to provide high quality inner and outer hermetic sealing, while still permitting each module to be readily mounted and removed for repair or replacement. This is achieved using a specially chosen and designed cast resin system for each module which not only provides for internal hermetic sealing of the module feedthrough contacts, but also provides a sufficiently hard outer resin surface for cooperative engagement with a sealing ring so as to permit obtaining a readily removable, hermetically sealed mounting of each module to the header plate.

An additional advantageous feature of the invention resides in the manner in which each module is constructed for cooperation with internal manifolding provided in the header plate so as to permit continuous and simultaneous pressure testing of the integrity of the module feedthrough contacts at the same time as the testing of the integrity of the sealing of the module mountings to the header plate. This additional feature is accomplished in a preferred embodiment of the invention by the provision of a construction and method of making for each module whereby a porous reticular dielectric preform is provided within each module for supporting the module feedthrough contacts during casting. The preform is chosen to be sufficiently porous so as to permit pressure testing of the integrity of the sealing of the module contacts after casting is completed. Internal manifolding is provided within the header plate communicating with these preforms so as to thereby permit continuous and simultaneous pressure testing of the integrity of the feedthrough contact sealing of the modules as well as the integrity of the sealing of the modules to the header plate.

The specific nature of the invention as well as other features of construction and further advantages, uses and application thereof will become apparent from the following detailed description taken in conjunction with the accompanying drawings in which:

FIG. 2 is a cross-sectional view illustrating details of the construction and mounting of a typical one of the feedthrough modules of FIG. 1.

FIGS. 3 and 4 are front and cross-sectional views illustrating the construction of the porous reticular preform provided in each module. The view of FIG. 4 is taken along the lines 4—4 of FIG. 3.

FIGS. 5 and 6 are front and cross-sectional views illustrating the construction of the self-energized, spring-loaded sealing ring employed in the assembly of FIG. 1. The view of FIG. 6 is taken along the lines 6—6 of FIG. 5.

Figure 1:
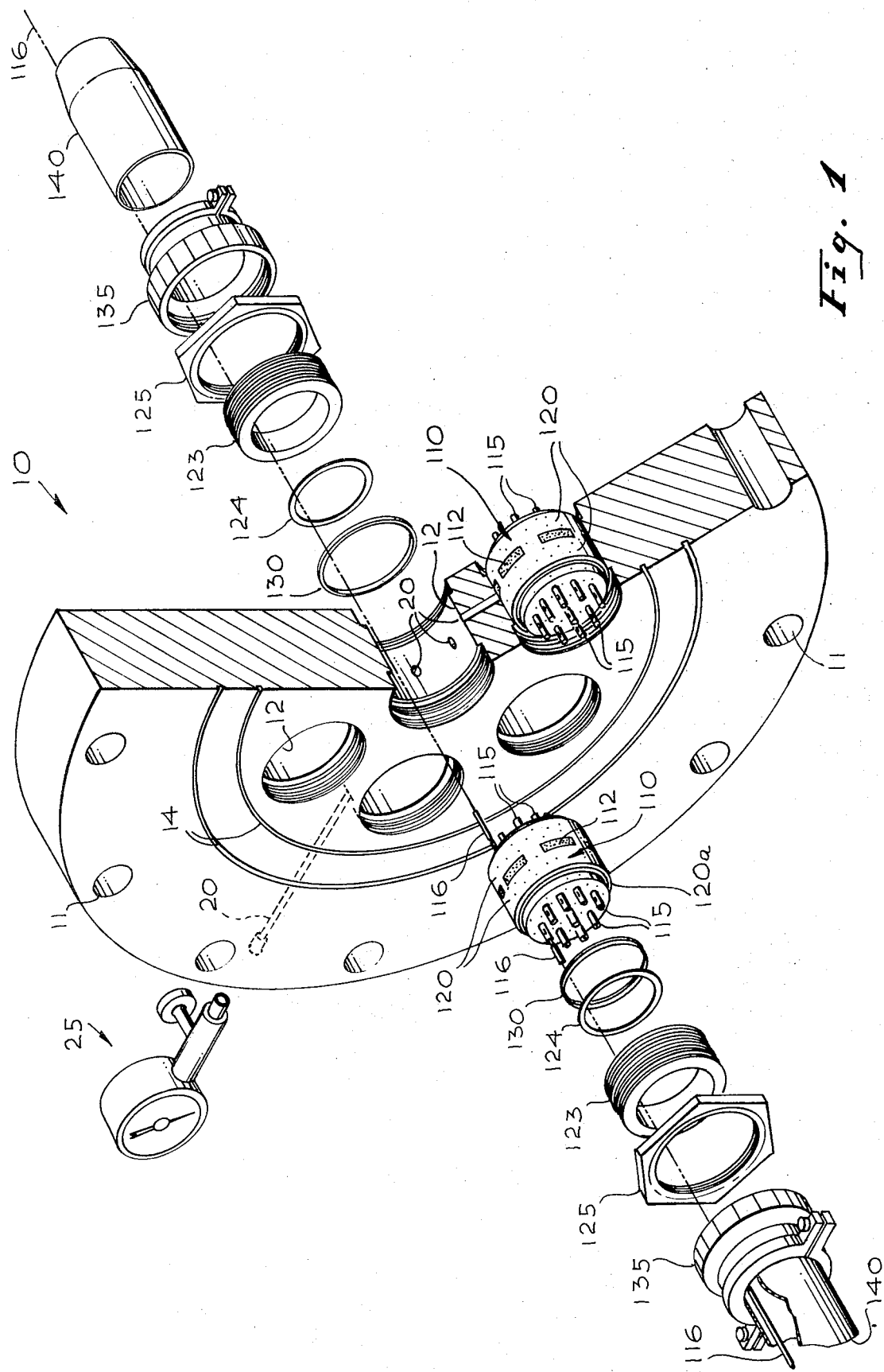
FIG. 1 is a perspective view of an exemplary embodiment of an electrical feedthrough assembly in accordance with the invention with a sector portion of the header plate being cut away, and with a typical feedthrough module and attached cables being shown in exploded fashion.

Like elements are designated by like numerals throughout the figures of the drawings. Also, to facilitate understanding of the invention, elements of the header plate 10 in FIGS. 1 and 2 are designated by numbers less than 100 and elements of the feedthrough module 110 and attachments are designated by numbers greater than 100.

Referring initially to the assembly illustrated in FIG. 1, a header plate 10 is provided having mounting holes 11 for mounting the header plate 10 to a welding neck flange on a steel pipe or nozzle (not shown) such as is typically provided on a containment structure for receiving electrical feedthrough connections. Circular O-ring grooves 14 are provided in the header plate 10 for sealing therebetween. Mounting of the header plate 10 to the containment structure could also be accomplished by welding if so desired.

As illustrated in FIGS. 1 and 2, the header plate 10 contains module receiving holes 12 in which feedthrough modules 110 are hermetically sealed and removable mounted in accordance with the invention. As best shown in FIG. 2, each feedthrough module 110 includes a module subassembly comprised of a dielectric preform 112 supporting one or more crimp-type contacts 115, and cast within a resin 120 which provides hermetic sealing of the contacts 115. For greater clarity, only the single contact 115 is illustrated in FIG. 2, but it is to be understood that additional contacts are similarly provided.

FIGS. 3 and 4 show details of the dielectric preform 112. It will be seen that the preform 112 is typically disc-shaped with holes 112a being provided therein for supporting respective contacts 115 during casting of the preform 112 and contacts 115 in the resin 120. The preform 112 may also be provided with apertures 112b about its periphery so that the resulting cast resin 120 will be connected on both sides of the preform for rigidly securing the preform 112 and contacts 115 therein.

In order to provide for pressure testing of the integrity of the sealing of the contacts 115, the dielectric preform 112 of FIGS. 4 and 5 is made of a porous reticular material, such as polyurethane. Non-porous layers 112c (FIG. 4), such as phenolic or other suitable coating, are bonded to the faces of the preform 112 to prevent flowing or absorption of the epoxy 120 into the preform 112 during casting. It will be noted that the edges of the preform 112 remain exposed to permit a pressure testing fluid (such as helium) to be passed through the preform 112 to the contacts 115.

As illustrated in FIGS. 1 and 2, internal manifolding is provided within the header plate 10 by the provision of ports 20 therein which, as best shown in FIG. 2, extend to each feedthrough hole 12 at a location so as to be adjacent the exposed porous edge of the preform 112 of a mounted module. The ports 20 are coupled to each other and to external pressure testing means, as generally indicated in FIG. 1 by the illustrated pressure gage and associated valve assembly 25. Simultaneous and continuous pressure testing of the integrity of the contact sealing within the modules is thus made possible via the ports 20 in the header plate 10 and the porous preform 112 provided in each module 110. As will become evident, hereinafter, the module design is such as to also permit continuous and simultaneous pressure testing of the integrity of the sealing of the module mountings to the header plate 10.

As pointed out earlier herein, an important feature of the invention resides in the provision of a readily removable, hermetically sealed mounting of each module 110 to the header plate 10. Obviously, this would not be possible if the preform 112 and contacts 115 were cast in the resin 120 while within the module receiving hole 12 of the header plate 10, since the resin would then become permanently affixed to the header plate 10 as well as to the preform 112 and the contacts 115, thereby making removal most difficult, if not impossible.

In accordance with the present invention a very different and much more advantageous approach is employed. Rather than being cast while in the header plate 10, the preform 112 and contacts 115 are instead cast before mounting in the feedthrough hole 12 using an appropriately shaped casting mold. The casting thermosetting resin formulation is specially chosen to not only provide the usual high quality hermetic sealing of the contacts 115 within the resin 120, but also to provide a sufficiently hard outer resin surface which permits the resulting cast module subassembly to be removably mounted and hermetically sealed in its receiving hole 12 in the header plate 10 using sealing rings 130. As best shown in FIG. 2, two such sealing rings 130 are provided at opposite ends of the resin 120, preferably by being press-fitted into recesses 120a provided in the resin 120 for this purpose. It will be noted in FIG. 2 that clearance is provided between the outer surface of the resin 120 and the inner surface of the receiving hole 12 in order to provide communication with the header plate port 20, thereby permitting pressure testing of the integrity of the sealing of the module mountings simultaneously with the testing of the integrity of the module contacts 115.

It has been found that an appropriate resin for use as the casting resin 120 is a high strength epoxy system having a glass filler of at least 50 percent by weight, with a coefficient of thermal expansion appropriately matching that of the contacts 115 and the header plate 10. A particularly advantageous type of filler which may be employed is silicon dioxide having rhombohedral cleavage and particle size no greater than 10 microns which has been treated with gamma-glycidoxypropyltrimethoxysilane. A preferred epoxy system employs approximately 60 – 65 percent, by weight, of such a filler along with a cycloaliphatic or diglycidyl ether of bisphenol A epoxy crosslinked with hexahydrophthalic anhydride and catalyzed with benyzyldimethylamine.

FIGS. 5 and 6 illustrate a particularly advantageous embodiment of a sealing ring 130 for use in providing a removable, hermetically sealed mounting of each module 110 in its receiving hole 12 in the header plate 10. The sealing ring 130 is of the self-energized, spring-loaded type and comprises a C-shaped ring member 130b in which a helical spring 130a is disposed for providing spring loading. The C-shaped member 130b is typically made of an elastomer (such as polyurethane or silicone) and the spring 130a may typically be stainless steel. During mounting of the module subassembly, the sealing rings 130 are subjected to sufficient pressure and heating so that the elastomer deforms onto the sealing surfaces to provide a very high degree of sealing. As shown in FIG. 2, the module receiving hole 12 contains recesses 12a for cooperative sealing engagement with the outer surfaces of the sealing rings 130, and also for providing axial alignment of the module subassembly in the module receiving hole 12.

In order to securely retain the module subassembly in the header plate 10, retaining rings 123 are threaded into the module receiving hole 12 using the threading provided on each for this purpose. Washer gaskets 124 are respectively interposed between the retaining rings 123 and the resin 120 for cooperative engagement with the self-energized sealing rings 130, thereby providing still further sealing for the module mounting. The washer gasket 124 may typically be comprised of a metal washer to which is bonded a ring gasket or resilient material such as neoprene or silicone.

Locking jam nuts 125 are next threaded onto the retaining rings 123 and tightened to rigidly secure the retaining rings 123 to the header plate 10 and thus the module 112 in its module receiving hole 12. The respective cable wires 116 to be interconnected, contained within a protective boat 140, are then attached to the crimp contacts 115 in a conventional manner. It is to be understood that, if desired, this attachment of the cable wires 116 to their respective contacts 115 can be done prior to mounting of the cast module subassembly in its receiving hole 12.

After the module 112 has been mounted in its receiving hole 12 with the cable wires 116 and the contacts 115 attached and the retaining rings 123 and 125 appropriately tightened, a dielectric resin 127 may then be poured into the retaining ring 123 around the contacts 115 and cable wires 116 and allowed to harden. This dielectric resin 127 is chosen so as to form a resilient, easily removable protective barrier against dirt and moisture for the insides of the module, and also serves to support the cable wires 116 inside the retaining rings 123. It is to be understood that the dielectric resin 127 is of a type which does not provide any significant bonding to the resin 120, the contacts 115, the cable wires 116, or the retaining rings 123, and thus will not interfere with the removal of a module 112 from its receiving hole 12 in the header plate 10. If desired, the surfaces contacted by the resin 127 could be appropriately coated so as to further reduce the possibility of any bonding taking place. It is also possible to employ an appropriate grommet instead of the resin 127 is so desired.

As indicated in FIGS. 1 and 2, a locking cable clamp 135 may optionally be provided on one or both ends of the module, such as by threading on the retaining rings 123.

It should now be evident how the above described embodiment makes it possible to readily and expeditiously remove a module 112 from its receiving hole 12 in the header plate 10. This is accomplished by first removing any capable clamps 135 that may be present. The jam nuts 125 and the retaining rings 123 are then removed along with the gaskets 124. The remaining module subassembly containing the preform 112, the contacts 115, the attached cable wires 116, and the sealing rings 130 press-fit into the recesses 120a, can then be readily removed from either end of the receiving hole 12 for repair or replacement.

Although the invention has been described herein with respect to a particular exemplary embodiment, it is to be understood that various modifications in construction, arrangement and/or use may be made without departing from the scope of the invention as defined in the appended claims.

The embodiments of the invention in which an exclusive property or privilege is claimed are defined as follows:

1. An electrical feedthrough module capable of being removably mounted and hermetically sealed in a module receiving hole of a supporting structure, said module comprising:
   a casting of electrically insulative material having at least one feedthrough electrical conductor hermetically sealed therein,
   said casting comprising a thermosetting epoxy resin having a glass filler of at least 50 percent by weight so as to provide an outer surface of sufficient hardness to permit removable mounting and hermetic sealing thereof in said module receiving hole said filler being silicon dioxide having rhombohedral cleavage and a particle size no greater than 10 microns which has been treated with gamma-glycidoxypropyltrimethoxysilane.

2. The invention in accordance with claim 1, wherein said epoxy resin employs approximately 60 – 65 percent by weight of said filler along with a cycloaliphatic ether of bisphenol A epoxy crosslinked with hexahydrophthalic anhydride and catalyzed with benzyldimenthylamine.

3. The invention in accordance with claim 1, wherein said epoxy resin employs approximately 60 – 65 percent by weight of said filler along with a diglycidyl ether of bisphenol A epoxy crosslinked with hexahydrophthalic anhydride and catalyzed with benzyldimethylamine.

4. The invention in accordance with claim 1, wherein at least one sealing ring is affixed to the exterior of said casting for use in removably mounting and hermetically sealing said casting in said module receiving hole.

5. An electrical feedthrough module capable of being removably mounted and hermetically sealed in a module receiving hole of a supporting structure, said module comprising:
   a casting of electrically insulative material having at least one feedthrough electrical conductor hermetically sealed therein,
   said casting comprising a thermosetting resin having a glass filler of at least 50 percent by weight so as to provide an outer surface of sufficient hardness to permit removable mounting and hermetic sealing thereof in said module receiving hole,
   said casting also including means providing for fluid communication to said conductor from outside of said casting so as to permit testing of the hermetic sealing of said conductor therein.

6. The invention in accordance with claim 5, wherein said means providing for fluid communication comprises a porous dielectric member.

7. The invention in accordance with claim 6, wherein predetermined surface portions of said member are provided with a non-porous layer for preventing absorption of said resin into said member during casting.

8. The invention in accordance with claim 6, wherein said conductor is diisposed in an opening provided in said porous dielectric member and wherein said member has an externally exposed surface.

9. The invention in accordance with claim 5, wherein said filler is silicon dioxide having rhombohedral cleavage and a particle size no greater than 10 microns which has been treated with gamma-glycidoxypropyltrimethoxysilane.

10. Electrical feedthrough means comprising:
supporting means having at least one module receiving hole provided therein,
an electrical feedthrough module mounted in said hole, and
mounting means removably mounting and hermetically sealing said module in said hole,
said module comprising a casting of electrically insulative material having at least one feedthrough electrical conductor hermetically sealed therein,
said casting comprising a thermosetting epoxy resin having a glass filler of at least 50 percent by weight so as to provide an outer surface of sufficient hardness to permit removably mounting and hermetic sealing thereof in said module receiving hole, said filler being silicon dioxide having rhombohedral cleavage and a particle size no greater than 10 microns which has been treated with gamma-glycidoxypropyltrimethoxysilane,
said mounting means including sealing ring means interposed between said casting and the inner surface of said hole for providing a removable hermetically sealed mounting of said casting therein.

11. The invention in accordance with claim 10, wherein said mounting means also includes retaining means provided at each end of said hole for removably securing said module therein.

12. The invention in accordance with claim 11, wherein said feedthrough electrical conductor is an electrical contact having a conductor receiving termination at each end thereof.

13. The invention in accordance with claim 11, wherein said supporting means is a header plate mountable in a containment structure.

14. Electrical feedthrough means comprising:
supporting means having at least one module receiving hole provided therein,
an electrical feedthrough module mounted in said hole, and
mounting means removably mounting and hermetically sealing said module in said hole,
said module comprising a casting of electrically insulative material having at least one feedthrough electrical conductor hermetically sealed therein,
said casting having a sufficiently hard outer surface for cooperative engagement with said mounting means so as to provide a removable hermetically sealed mounting thereof in said hole,
said supporting means including internal manifolding means communicating with said hole, and
said casting including means providing for fluid communication between said internal manifolding means and said conductor.

15. The invention in accordance with claim 14, wherein said means providing for fluid communication comprises a porous dielectric member.

16. The invention in accordance with claim 14, wherein said internal manifolding includes an access port provided in the inner surface of said hole and located so as to permit testing of both the sealing of said casting in said hole and the sealing of said conductor in said casting.

17. The invention in accordance with claim 14, wherein said casting includes a filler of silicon dioxide having rhombohedral cleavage and a particle size no greater than 10 microns which has been treated with gamma-glycidoxypropyltrimethoxysilane.

18. A method of making and mounting an electrical feedthrough assembly in a receiving hole of a supporting structure, comprising the steps of
supporting at least one feedthrough electrical conductor in a porous dielectric member prior to casting,
casting said porous dielectri member and said feedthrough electrical conductor in a thermosetting epoxy resin chosen to provide hermetic sealing of said conductor therein and having a glass filler of at least 50 percent by weight so as to provide a sufficiently hard outer surface for removable mounting and hermetically sealing of the casting in said receiving hole, said filler being silicon dioxide having rhombohedral cleavage and a particle size no greater than 10 microns, which has been treated with gamma-glycidoxypropyltrimethoxysilane,
said casting being performed in a manner so as to leave exposed a predetermined portion of said member and so as to prevent absorption of said resin into said member during casting, and
mounting the resulting casting in said receiving hole using at least one sealing ring cooperatively disposed therebetween.

* * * * *